United States Patent [19]

Barton et al.

[11] Patent Number: 4,690,563
[45] Date of Patent: Sep. 1, 1987

[54] HOLE CENTRATION GAGE

[75] Inventors: Richard O. Barton, Levittown; Michael T. Bergin, Bayside; John M. Miller, Huntington Station, all of N.Y.

[73] Assignee: Grumman Aerospace Corporation, Bethpage, N.Y.

[21] Appl. No.: 766,506

[22] Filed: Aug. 16, 1985

[51] Int. Cl.[4] ............................................. G01B 11/00
[52] U.S. Cl. ..................................... 356/375; 356/1; 356/400
[58] Field of Search ................. 356/138, 152, 153, 1, 356/399, 400, 401, 375; 250/227

[56] References Cited

U.S. PATENT DOCUMENTS

| | | | |
|---|---|---|---|
| 3,938,895 | 2/1976 | Bridger et al. | 356/152 |
| 4,071,753 | 1/1978 | Fulenwider et al. | 250/227 |
| 4,243,877 | 1/1981 | Cruz | 356/152 |
| 4,346,993 | 8/1982 | Trost et al. | 356/138 |
| 4,373,804 | 2/1983 | Pryor et al. | 356/1 |
| 4,427,881 | 1/1984 | Ruell | 250/227 |
| 4,452,506 | 6/1984 | Reeve et al. | 250/227 |
| 4,460,826 | 7/1984 | Pryor | 250/227 |
| 4,558,949 | 12/1985 | Uehara et al. | 350/400 |

Primary Examiner—R. A. Rosenberger
Attorney, Agent, or Firm—Richard G. Geib

[57] ABSTRACT

An apparatus for measuring the relative positions of hole patterns is disclosed wherein two or more fiber optic bundles disposed within first and second holes and connected to one or more sources of light and light sensitive, position sensing devices provide two, three, four, or five axis measurements of the relative positions of the two holes. By measuring the position of the light from the source transmitted via an optical bundle in the first hole and received by an optical bundle in the second hole, a precise measurement system that senses mismatch and the direction thereof with a very high degree of accuracy is achieved. The movement of plane surfaces may also be measured with the present apparatus by attaching either the transmitting or receiving side of the apparatus to a part which is subjected to a load, and measuring the resulting change in the position of the light beam illuminating the light sensitive, position sensing device.

26 Claims, 16 Drawing Figures

HOLE CENTRATION GAGE

BACKGROUND OF THE INVENTION

The present invention relates to positional alignment systems, and more particularly, to an optical system for determining the relative position and center line collineation of hole patterns and for measuring the movement of plane surfaces.

In many manufacturing activities such as the complex act of building of large aircraft assembly fixtures or the simple act of drilling holes in a flat pattern part there is a need to measure the relative mismatch of two hole centerlines one with respect to another. Thus, in the latter application after the hole pattern has been drilled it is often required to know how precisely the hole positions in the part match the hole positions in a drill jig from which it was fabricated. One method that is typically used to determine mismatch, is fitting the largest pin that will pass through both the hole in the drill jig and the hole in the part. This technique has several drawbacks. First, it does not define the true location of one hole with respect to another. Second, undersize pins introduce a number of geometric errors into the measurement between holes implying centerline collineation that in fact may not exist. Third, this technique is a trail and error process of selecting the pin that fits from a range of pins which is both time consuming and imprecise since the quality of the pin fit selection can vary with the skill of the technician. Finally, if more than one pin is inserted, they can "load" up or distort the hole in the part and affect the measurement.

SUMMARY OF THE INVENTION

Accordingly, it is a primary object of the present invention to provide a positional measuring system which is capable of readily measuring the position of one hole with respect to a second hole to allow two hole patterns to be easily aligned.

It is another object of the present invention to provide a positional measuring system of the foregoing type which is capable of either two or three axis positional measurements.

It is a further object of the present invention to provide a positional measuring system of the foregoing type which is capable of simultaneously measuring the centerline angularity of one hole relative to another, as well as the relative positions of hole patterns, and the movement of plane surfaces.

It is yet another object of the present invention to provide a positional measuring system of the foregoing type that is capable of measuring pitch and yaw as well as three axis positional measurements.

The present invention is a hole centration gage which utilizes a plurality of fiber optic bundles in combination with one or more light sources and one or more light-sensitive, position-sensing devices to provide a measure of the relative position of one hole with respect to a second hole. In addition, it can provide a measure of the movement of a plane surface in response to stress. The present invention is a precise measurement system that measures relative position or degree of movement with a very high degree of accuracy.

In a first embodiment of the invention, first and second fiber optic bundles, disposed within first and second holes, respectively, in corresponding workpieces serve to provide a two axis (x and y) measurement of the relative positions of one hole with respect to another. A source of light provides an input to the first fiber optic bundle, i.e., the transmitting bundle in the first hole, while a light sensitive, position sensing device, connected to the second fiber optic bundle, i.e., the receiving bundle in the second hole, senses the relative positions of the two holes. The transmitting bundle may be either a single fiber, or a random bundle whose transmitted beam diameter must be smaller than the diameter of the receiving element if a coherent fiber receiving bundle is used. If the diameter of the transmitting element is identical to the diameter of the receiving bundle, a coherent bundle must also be used for the transmitting element with only the central portion of the transmitting bundle illuminated as with a Gaussian distributed energy source. This allows the relative alignment between the two holes in the two workpieces to be determined by measuring the position of the highest point of intensity of the light transmitted from the light source via the transmitting fiber optic bundle through the receiving fiber optic bundle.

In a second embodiment of the invention, the arrangement of the first embodiment is adapted to be used as an extensionometer to provide a measure of the resulting movement of a plane surface due to the application of a load to such surface and the resulting stress thereon. A fiber optic bundle, attached to the body having the plane surface, acts as either a light transmitting or receiving medium to provide a measure of the degree of resulting movement. In the former case, the fiber optic bundle is illuminated by a source of light connected to the bundle, while the light-sensitive, position-sensing device is positioned adjacent to the opposite end of the fiber optic bundle on a stable surface. In the latter case, the fiber optic bundle is connected to the light-sensitive, position-sensing device, while the light source is positioned adjacent to the opposite end of the bundle on the stable surface.

In a third embodiment of the invention, a second transmitting fiber optic bundle, in addition to the transmitting and receiving bundles used in the first embodiment, is disposed within the hole of the first workpiece to provide a three axis measurement of the relative positions of two holes. One of the transmitting bundles is oriented along the central axis of the first hole, while the second is oriented at a predetermined angle with respect to such axis. The third, receiving fiber optic bundle, disposed within the second hole in the second workpiece, corresponds to the receiving bundle of the first embodiment. The two transmitting fiber optic bundles disposed within the first workpiece are alternately illuminated by a source of light, while a light-sensitive, position-sensing device alternately provides x-y and z axis measurement of the relative positions of the two holes. Thus, a three axis alignment between the two holes is performed in two steps. First, the receiving fiber optic bundle is illuminated by the transmitting fiber optic bundle oriented along the central axis of the first hole to produce a measurement of the x-y positioning between the two holes. Once the two holes are aligned along the x-y axis, the receiving bundle is illuminated by the transmitting fiber optic bundle oriented at a predetermined angle with respect to the central axis of the first hole to obtain alignment along the z axis.

In a fourth embodiment of the invention, a first, transmitting, fiber optic bundle and a second, receiving, fiber optic bundle, disposed within first and second holes respectively in corresponding workpieces serve to provide four axis (x, y, pitch, and yaw) measurement of the relative positions of one hole with respect to the other. A first light-responsive, position-sensitive device associated with the transmitting bundle and a second light-responsive, position-sensitive device associated with the receiving bundle provide the four axis measurements. A first portion of the light transmitted by the first bundle is reflected along the central axis of the first hole and is passed by a semi-reflective coating on the second bundle to the second sensing device to provide the x-y measurement. A second portion of the light transmitted by the first bundle is reflected back by the semi-reflective coating to the first sensing device to provide the pitch and yaw measurement.

In a fifth embodiment of the invention, two transmitting fiber optic bundles, disposed within a first hole in a first workpiece along the central axis thereof and at a predetermined angle thereto, respectively, and illuminated by separate frequency modulated light sources serve to effect a five axis (x,y,z and pitch and yaw) measurement of the relative positions between the first hole in the first workpiece and a second hole in a second workpiece. First and second light-sensitive, position-sensing devices and a third fiber optic bundle, disposed within the second hole, provide the x,y,z axis measurements and the pitch and yaw measurements, respectively. A first portion of the light transmitted by the first transmitting fiber optic bundle oriented along the central axis of the first hole and passed by the receiving bundle to the first sensing device provides the x-y measurement, while a second portion of such transmitted light reflected by a partial mirror coating on one end of the receiving bundle onto the second sensing device provides the pitch and yaw measurement. In addition, light transmitted by the second transmitting fiber optic bundle oriented at a predetermined angle with respect to the central axis of the first hole and passed by the receiving bundle to the first sensing device provides the z axis measurement.

DETAILED DESCRIPTION OF THE PREFERRED EMBODIMENT

Figure 1:
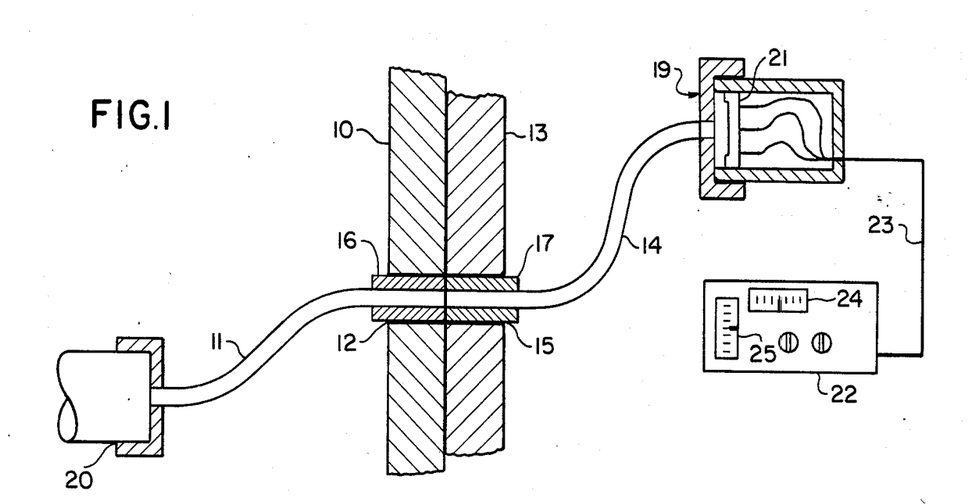
FIG. 1 illustrates the hole centration gage of the present invention for two axis measurements of the relative positions of hole patterns.

Referring now to FIG. 1, shown therein is the apparatus utilized to make two axis (x and y) measurements of the relative positions of hole patterns. A first workpiece 10, having a light transmitting fiber optic bundle 11 disposed within a first hole 12 therein, is located in proximity to, for alignment with, a second workpiece 13, having a light receiving, coherent fiber optic bundle 14 disposed within a second hole 15 located therein. Light transmitting bundle 11 and light receiving bundle 14 are each comprised of one or more optical fibers capable of transmitting light along their length from one point to another. The fibers comprising transmitting bundle 11 need not be coherent, i.e., have the same positional orientation with respect to one another at both ends, although those of the receiving bundle 14 must be. Further, the diameter of the fiber bundle 11 must be less than the diameter of fiber bundle 14.

Optical bundles 11 and 14 are positioned within their respective holes by means of ferrules 16 and 17, respectively, whose outer diameters are precision ground for a close slip fit into corresponding holes 12 and 15. Ferrules 16 and 17 hold the fiber optic bundles in place and compensate for differences between the diameter of the holes to be aligned and the diameter of the bundles inserted therein. Suitable means such as a set screw (not shown) in each of the ferrules serves to hold the bundles therein, although it should be noted that an appropriate adhesive (not shown), such as epoxy, can also be used for this purpose.

The input of transmitting bundle 11 is illuminated by a light source 20, preferably a 6328 Å, Class II, Helium, Neon Laser, connected to it, while the output of light receiving bundle 14 is connected to a receiving unit 19 containing a light sensitive target 21, such as a typical silicon position-sensing photodetector which, in turn, drives a multi-display recording unit 22 through a cable 23. Suitable position-sensing photodetectors meeting the requirements of our invention are available commercially from Quantrad Corporation, Torrance, Calif. It should be understood that, in the context of our invention, light can be electromagnetic energy in an appropriate wavelength whether in the visible or invisible range of the spectrum. Acting together, target 21 and recording unit 22 provide a measurement of the relative positions of holes 12 and 15 in the x-y plane. In the preferred embodiment of the present invention, light source 20 has a predictable center of energy such as a Gaussian distribution from a laser or a flat distribution that is obtainable from a photo diode, if such is used as the light source.

Recording unit 22 is a balanced amplifier with an x axis balanced meter display 24 and a y axis balanced meter display 25. The axial orientation of transmitting fiber bundle 11 is immaterial; however, the orientation of the receiving fiber bundle 14 must be such that the x and y axes correspond to the respective meters of associated displays 24 and 25.

Figure 2:
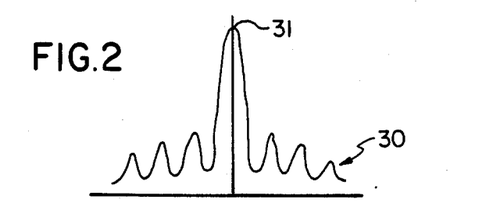
FIG. 2 illustrates a typical Gaussian distribution of the light received by the light-sensitive, position-sensing device used in the present invention to provide x-y and z and pitch and yaw positional measurement.

Referring now to FIG. 2, the light received by target 21 can be seen as having an intensity distribution 30 with a peak 31 at its center. This is a normal Gaussian distribution of a laser energy source creating a measurable center of energy, thus allowing the diameters of transmitting and receiving coherent bundles to be equal. A flat distribution as with an I.R. diode requires the transmitting bundle to be smaller in diameter than the receiving bundle. This smaller transmitting bundle does not require coherency and may comprise a single, or plurality of random fibers.

Figure 3A:
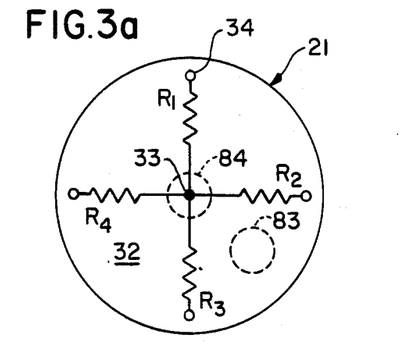
FIGS. 3a through 3d are plan views of the target surface of the light-sensitive, position-sensing device of the present invention illustrating sample x-y, z and pitch and yaw positional requirements.

In FIG. 3a, a simplified representation of the target surface 32 of photocell 21 is illustrated. As can be seen therein, photocell 21 includes a centrally disposed contact 33 and a plurality of peripherally disposed contacts 34 mounted on surface 32 which surface 32 is semiconductive, its resistance varying with the intensity of light striking it. This characteristic of surface 32 is illustrated by a plurality of resistances, R1 through R4, extending from central contact 33 radially outward to peripheral contacts 34. When light transmitted by receiving bundle 14 strikes surface 32, the value of resistances R1–R4 changes in response to the location of the light striking the semiconducting surface.

Figure 3B:
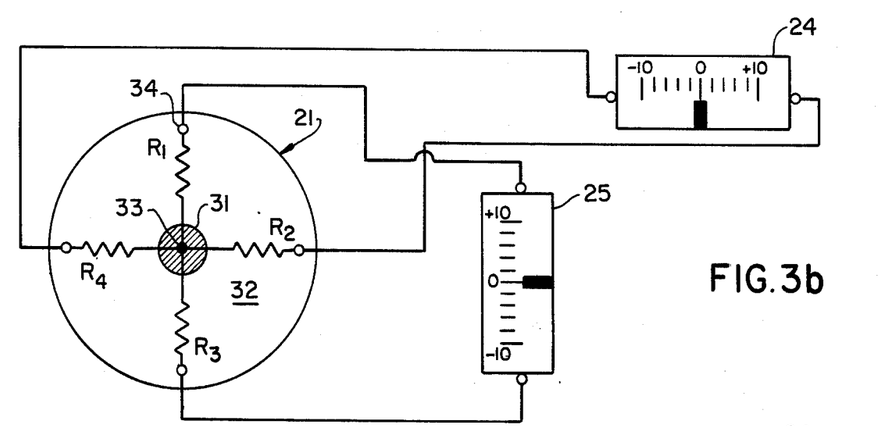
Figure 3C:
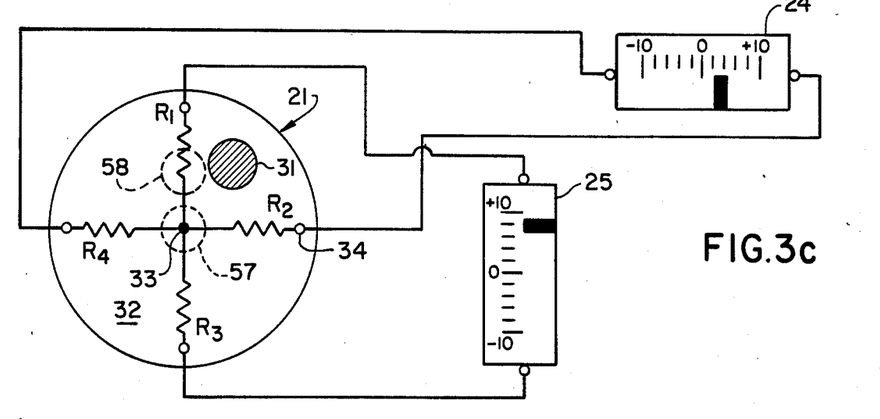
Figure 3D:
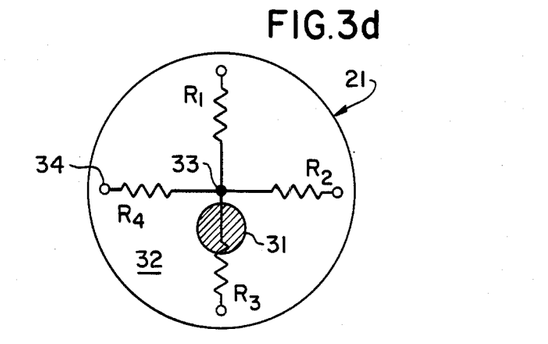

FIG. 3b illustrates the center of energy 31 impinging precisely on the centrally disposed contact 33 of surface 32. In this condition, the reduction in resistance of R1 through R4 will thus be equal and an equal current flow will be provided to each terminal of the balanced meters of displays 24 and 25 such that a zero or null position is indicated. FIG. 3c illustrates one typical offset of the center of energy 31 from the null position. As shown in FIG. 3c, the offset is into the upper right quadrant of the target surface 32. The absolute offset of energy center 31 from center contact 33 is reflected in the reduction of resistance of R1 and R2. This causes a proportional change in the output signal from photocell 21 to recording unit 22. FIG. 3d illustrates an offset along one axis only. This signal change causes four amplifiers (not shown) within the recording unit 22 to become unbalanced. This, in turn, causes a change in the x-y display provided by meters 24 and 25, the new display being indicative of the relative offset between holes 12 and 15. It can be readily seen that as the location of point 31 changes, the measure of the relative positioning between holes 12 and 15 will correspondingly vary.

To obtain an accurate measurement of the relative positions of holes 12 and 15, measuring unit 22 is initially adjusted for a null point. This initialization is achieved by performing either a mechanical adjustment of the transmitting cable or an electrical adjustment of unit 22 itself to obtain a null thereof at near and far positions between transmitting bundle 11 and receiving bundle 14. Where a physical adjustment is used, transmitting fiber optic bundle 11 is positioned in ferrule 16 adjacent receiving fiber optic bundle 14 in ferrule 17 in a "V" block (not shown), and mechanically rotated 180 degrees until amplifier 22 is nulled. This procedure is then repeated for a far position between the two bundles. For this instance, the orientation of receiving bundle 14 within ferrule 17 is not adjusted because it is immaterial.

Figure 4A:
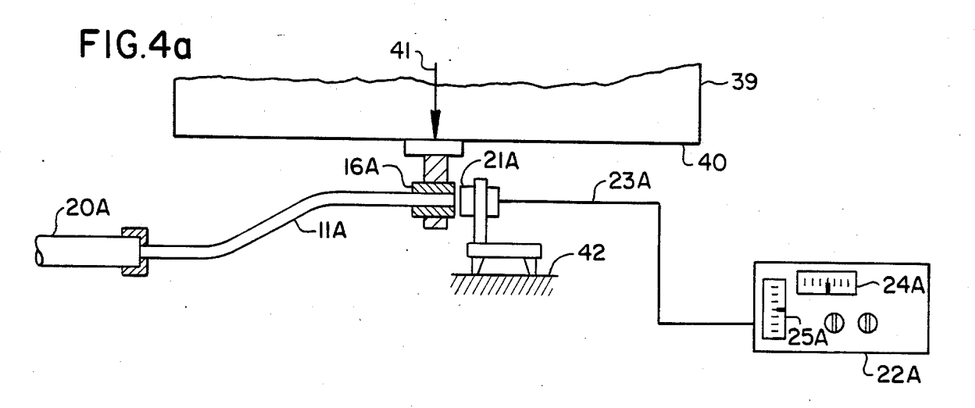
FIGS. 4a and 4b illustrate two alternative embodiments of the present invention for measuring the movement of plane surfaces.
Figure 4B:
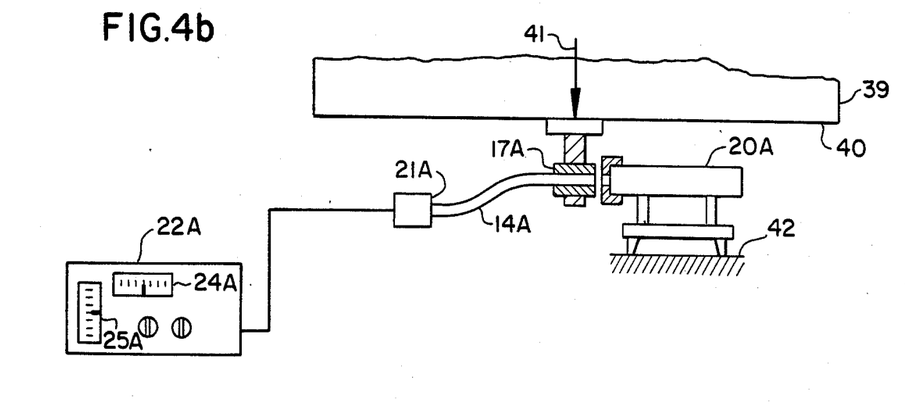

Referring now to FIGS. 4a and 4b, illustrated therein are alternative apparatuses for adapting the measuring principles used in the embodiment of FIG. 1 to measuring the movement of plane surfaces, as in, for example, sheet elongation tests.

Referring to FIG. 4a first, a horizontally disposed part 39 which can be a sheet of material with a plane surface or edge 40 is subjected to a selected load 41, illustrated in the form of an arrow. The amount by which surface or edge 40 moves due to stretching in part 39 in response to the application of load 41 is measured by a light-sensitive, position-sensing target 21A, which is mounted on a stable surface 42. Target 21A is illuminated by light source 20A through fiber optic transmitting bundle 11A, which is mounted within a ferrule 16A attached to the surface 40 of part 39. Light sensitive target 21A, in turn, drives a measurement recording unit 22A identical to recording unit 22 of FIG. 1 via a connecting cable 23A to provide an indication of the degree of movement in surface 40 because of the elongation of part 39 under the load.

In this embodiment of the invention, transmitting bundle 11A and target 21A are initially aligned in a manner similar to that used with the embodiment of FIG. 1 to produce a null condition in the balanced meters of displays 24A and 25A of recording unit 22A. As shown in FIG. 3b, the center of energy 31 impinges precisely on center contact 33 of surface 32 of the photocell 21, producing a null. In response to the application of load 41 to part 39, a stress occurs therein that results in a movement of plane surface 40 in the direction that the load is applied. This movement results in a corresponding shift in ferrule 16A and bundle 11A mounted therein, and thus, in the point where the center of energy 31 strikes the photosensitive surface of target 21A. As shown in FIG. 3d, the shift in plane surface 40 causes the center of energy 31 to strike an area directly below the center contact 33 inreasing the current through R3 which causes the balanced meters to become unbalanced, resulting in a display of the positional offset by the appropriate meter of the recording unit 22A.

FIG. 4b shows an alternative embodiment of the invention that can be used to measure movement of plane surfaces. Operation of this embodiment is identical to that disclosed in FIG. 4a, except that a receiving fiber optic bundle 14A, mounted within a ferrule 17A, is substituted for transmitting bundle 11A attached to edge 40 of part 39, and light source 20A is now mounted on the stable surface 42, rather than target 21A being mounted thereon.

Figure 5:
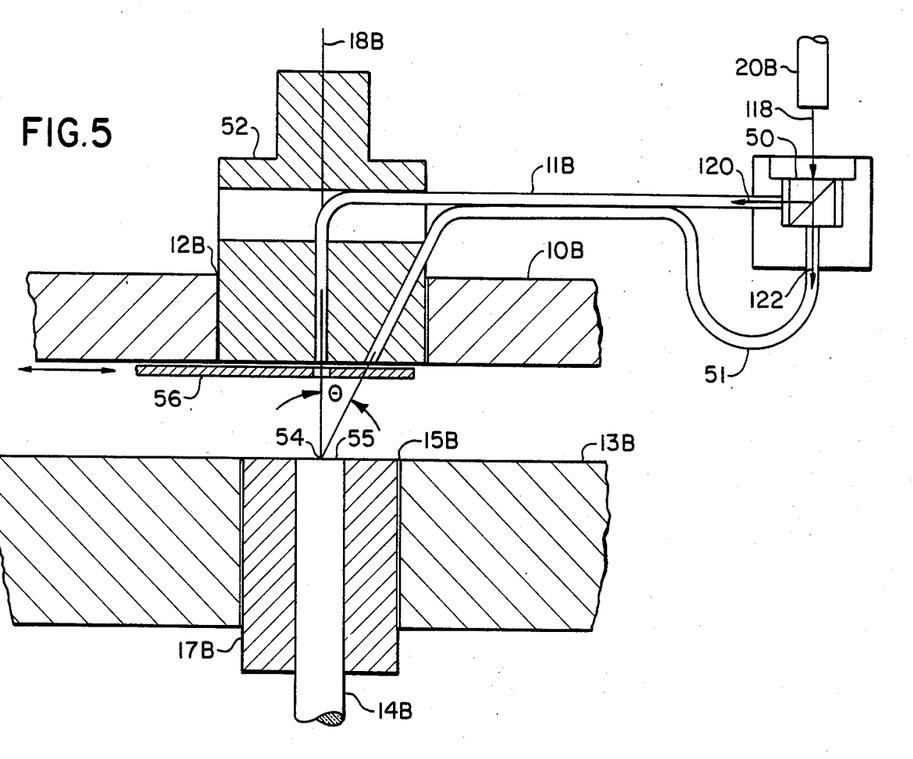
FIG. 5 illustrates another alternative embodiment of the present invention for three axis measurements of the relative positions of hole patterns.

Referring now to FIG. 5, the apparatus used to measure the relative positions of hole patterns along three axes (x,y, and z) is illustrated therein. As shown in FIG. 5, a beam 118 from a source of light 20B illuminates, and is split by, a beam splitter 50 to produce two light beams 120 and 122. First and second fiber optic transmitting cables 11B and 51, configured to transmit the first and second light beams 120 and 122, respectively, are disposed within a ferrule 52, which is fitted into a hole 12B of a first workpiece 10B. Cables 11B and 51 are positioned within ferrule 52 such that the former is oriented along the central axis 18B of hole 12B, while the latter is oriented at a predetermined angle $\theta$ with respect to such axis.

A third, receiving unit, fiber optic cable 14B, connected to a light sensitive, position-sensing apparatus (not shown) identical to target 21 and recording unit 22 of FIG. 1, is mounted in a second ferrule 17B, which in turn, is fitted into a second hole 15B in a second workpiece 13B. Transmitting cables 11B and 51 are arranged in ferrule 52 so that their opto-mechanical axes intercept at a point 54 located on the end surface 55 of receiving unit bundle 14B positioned at the opening of hole 15B being aligned with hole 12B.

The three dimensional alignment of holes 12B and 15B using the embodiment of the invention illustrated in FIG. 5 is a two step process. First, the two holes are aligned in the x-y plane so as to get a first null in the x-y measurement using the measuring method discussed in connection with the embodiment illustrated in FIG. 1. Thereafter, alignment along the z axis is performed. This two step process is performed by alternately illuminating receiving cable 14B with light transmitted by bundles 11B and 51. For this purpose, ferrule 52 is provided with a sliding shutter 56 which is used for transmitting selectively light from light source 20B via only one of light transmitting cables 11B and 51 at a time. It will be understood that the measurement of the two holes in the x-y plane will be done with shutter 56 position as shown in FIG. 5 such that light from the on-axis optical cable 11B is used in the procedure.

It can be readily seen from the apparatus illustrated in FIG. 5 that there is only one point where holes 12B and 15B are properly aligned along the x, y and z axes. As shown in FIG. 3c, once proper alignment along the x and y axes is achieved, if proper alignment along the z axis also exists, center of energy 31 of the light passed by bundle 14B will strike surface 32 of target 21 at center point 57, shown in phantom. Alternatively, if alignment along the z axis is incorrect, the point at which the center of energy 31 will strike surface 32 would be at a point 58 offset a certain distance from point 57 representative of the distance by which the z axis alignment is off.

The light beam transmitted via the angled fiber optic light transmitting cable 51 may be oriented to provide a direct or proportional measurement of z axis offset. In addition, this measurement can be read out on the same display used to make the x-y axis displacement measurement. In the preferred embodiment of the invention, the angle at which bundle 51 is oriented with respect to center axis 18B is 45 degrees. Accordingly, any displacement measured on either of the two displays of the recording unit is in a numerical 1:1 scale relationship to the displacement of hole 15B along the z axis from the null point intersect of the two opto-mechanical axes of bundles 11B and 51.

Figures 6A, 6B:
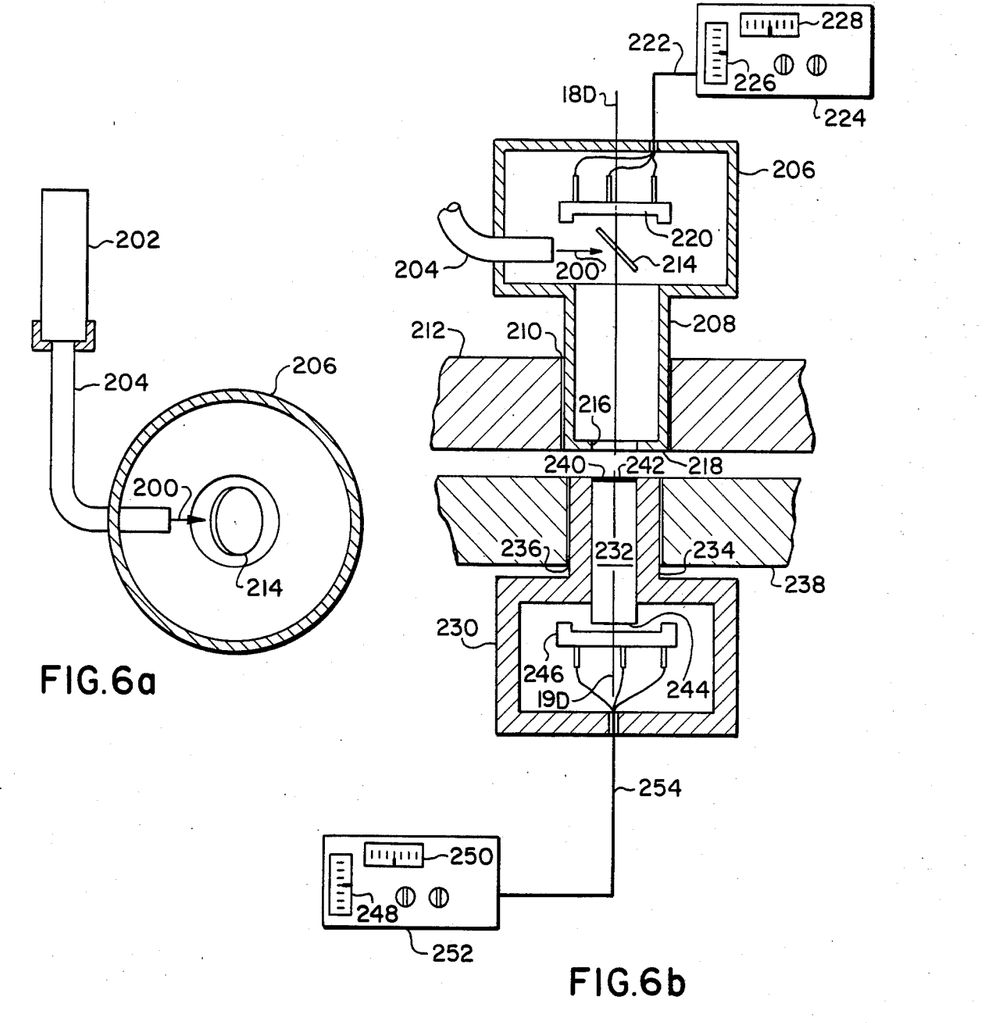
FIGS. 6a and 6b illustrate a yet further embodiment of the present invention for four axis measurements of the hole patterns.

Referring next to FIG. 6a and 6b, an embodiment of our invention used to measure the relative positions of hole patterns along four axes (x, y, pitch, and yaw) is illustrated therein. As shown in the Figures, light 200 from a source 202 is conducted through fiber optic cable 204 to a transmitting unit ferrule 206 whose precision ground shank portion 208 is fitted into a hole 210 of a first workpiece 212. A beamsplitter 214 positioned in the ferrule 206 reflects light beam 200 such that it travels down the shank of the ferrule along the central axis 18D of hole 210. A hole 216 is provided in the end 218 of the ferrule for the passage of the light beam. At the other end of the ferrule, a radiation-responsive, position-sensitive target such as a photocell 220 is located on central axis 18D in a position above beamsplitter 214. Target 220 is connected by means of an electrical cable 222 to a recording unit 224 such that the target electrical output drives the balanced display meters 226 and 228 of the recording unit.

A receiving unit ferrule 230 containing a fiber optic bundle or cable 232 has a precision ground shank 234 fitted into a hole 236 of a second workpiece 238. The illuminated end 240 of receiving bundle 232 is provided with a uniform coating 242 of the type known in the art which passes a portion of the light impinging thereon and reflects the rest. Coating 242 may be a uniform coating of metallic flecks of either chrome or silver forming a partial mirror. Positioned at the output end 244 of receiving fiber optic bundle 232 is a radiation-responsive, position-sensitive target such as photocell 246 whose electrical output drives balanced display meters 248 and 250 of a recording unit 252 through an electrical cable 254.

In operation, light beam 200 from source 202 is reflected by beamsplitter 214 such that it is projected out of hole 216 in lower end 218 of transmitting unit ferrule 206 to illuminate the end 240 of the receiving fiber optic bundle 232. Coating 242 on the end of the receiving bundle allows the passage of a portion of the light impinging thereon. This portion of the light is transmitted by optic bundle 232 to the light-sensitive target to drive the display meters 248 and 250 of the recording unit 252. This arrangement provides an x-y measurement of the relative positions of holes 210 and 236 in a manner similar to the measuring method disclosed in connection with the embodiment of our invention shown in FIG. 1.

The balance of the light of beam 200 not passed by the coating on the end of the receiving optical bundle 232 is reflected back into ferrule 206 such that it passes through the beamsplitter 214 and impinges on the photo-sensitive target 220. Target 220, which is sensitive to the position of the light striking it, provides a measurement of pitch and yaw of hole 210 with respect to hole 236 by autoreflection in that the offset on the photocell is the tangent of the pitch and yaw angle.

FIGS. 7a through 7d illustrate plan and side elevational views, in section, of alternative apparatuses comprising a fourth embodiment of the present invention used to measure the relative positions of hole patterns along five axes, (x, y, z, pitch, and yaw) i.e., linear and angular displacement in the vertical and horizontal directions, respectively.

As shown therein, a first source of light 65, modulated at a first frequency $f_1$, illuminates a first fiber optic bundle 11c whose output end is oriented perpendicular to the central axis 18C of a first hole 12C located within a first workpiece 10C. A second source of light 66, modulated at a second frequency $f_2$, illuminates a second transmitting fiber optic bundle 51A whose output end is oriented at a predetermined angle between 0 and 90 degrees with respect to the central axis 18C of hole 12C. First and second transmitting bundles 11C and 51A are mounted within a ferrule 67 fitted into hole 12C of workpiece 10C. First transmitting bundle 11C transmits the modulated light beam from light source 65 to a beam splitter 68 (FIG. 7b) disposed within ferrule 67, and oriented at an appropriate predetermined angle with respect to the central axis thereof. Beam splitter 68 serves to reflect a portion of the light beam from modulated light source 65 through an opening 69 in one end 126 of ferrule 67 such that it falls on one end 70 of a receiving fiber optic bundle 14C disposed within a second hole 15C of a second workpiece 13C substantially adjacent to workpiece 10C for alignment therewith. A second ferrule 17C fitted within hole 15C serves to maintain the end portion of receiving bundle 14C in an orientation in which end 70 is perpendicular to the central axis 19C of hole 15C. It will be noted that, unlike the previously disclosed embodiments of the present invention in which the orientation of the transmitting bundle means was immaterial, in the embodiment disclosed in FIGS. 7a through 7d, this above described orientation of the transmitting bundle means must be maintained.

Figure 7A:
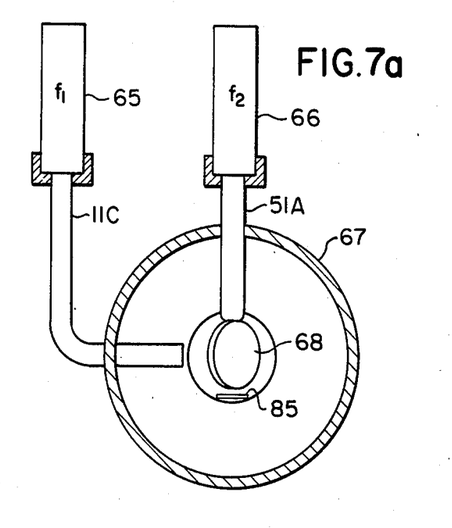
FIGS. 7a through 7d illustrate plan and side elevational views, in section, of two additional embodiments of the present invention for five axis measurements, including pitch and yaw, of the relative positions of hole patterns.

The illuminated end 70 of receiving bundle 14C is provided with a uniform coating 91 which passes a portion of the light illuminating it and reflects the rest.

This coating may suitably be a dielectric coating which passes certain frequencies of light and reflects others. It may also be a uniform coating of metallic flecks of either chrome or silver forming a partial mirror. The portion of light passed by the coating on end 70 is transmitted by bundle 14C to a first light sensitive target 20C which drives a recording unit 74, similar to recording unit 22 of FIG. 1, through a notch filter 73 by means of cable 72. This arrangement as described to this point provides an x-y measurement of the relative positions of holes 12C and 15C in a manner similar to the measuring method disclosed in connection with the embodiment illustrated in FIG. 1.

As shown, the signal from photocell 20C is first fed through a notch filter 73 designed to pass only the $f_1$ frequency signal from the transmitted modulated light. The filtered signal is then passed to recording unit 74 which has x and y displays 75 and 76, respectively.

The remainder of the light not passed by the coating on end 70 is reflected to a second light sensitive target 77 positioned above beam splitter 68 in ferrule 67. Target 77, which is a photocell identical in construction to target 20C, provides a measurement of the pitch and yaw of hole 15C with respect to hole 12C by autoreflection in that the offset on the photocell is the tangent of the pitch and/or yaw angle. Targets 20C and 77 can be typical position-sensing photodetectors similar in all respects to the previously described photosensitive target 21 embodied in FIG. 1. Target 77 is connected via a cable 78 to a recording unit 79 having two displays 80 and 81 for displaying measures of pitch and yaw respectively. It is readily apparent from FIG. 7b that where the central axes of holes 12C and 15C are not collinear, light passing from beam splitter 68 will strike surface 70 of the end of receiving bundle 14C at a given angle, such that it is reflected therefrom at a corresponding angle and caused to strike the photosensitive surface of target 77 at a point other than its center and corresponding to point 83 of photocell 21 in FIG. 3a. The offset of point 83 is representative of the amounts of pitch and yaw of hole 15C with respect to hole 12C. Conversely, where the central axes of these holes are collinear, the light passing from beam splitter 68 will strike surface 70 head on so that it is reflected back on itself and caused to strike surface of target 77 at the centerpoint thereof. This point, as indicated by broken line spot 84 in FIG. 3a, is indicative of the absence of pitch and yaw.

Referring again to FIG. 7c in particular, a z axis measurement is obtained by second fiber optic transmitting bundle 51A transmitting the modulated light beam from light source 66 to a full mirror 85 which is positioned parallel to the central axis 18C of hole 12C. This mirror, in turn, reflects this modulated beam of light to surface 70 of receiving bundle 14C. The portion of light passed by surface 70 through bundle 14C strikes target 20C to provide a z axis measurement of the relative positions of holes 12C and 15C in a manner similar to that disclosed in connection with the embodiment illustrated in FIG. 5. The resulting signal generated by target 20C is fed via cable 72A to a second notch filter 86 which filters out the $f_2$ signal and passes it to a second multi-display recording unit 87 for display of the z axis measurement of the relative positions between holes 12C and 15C.

Figure 7B:
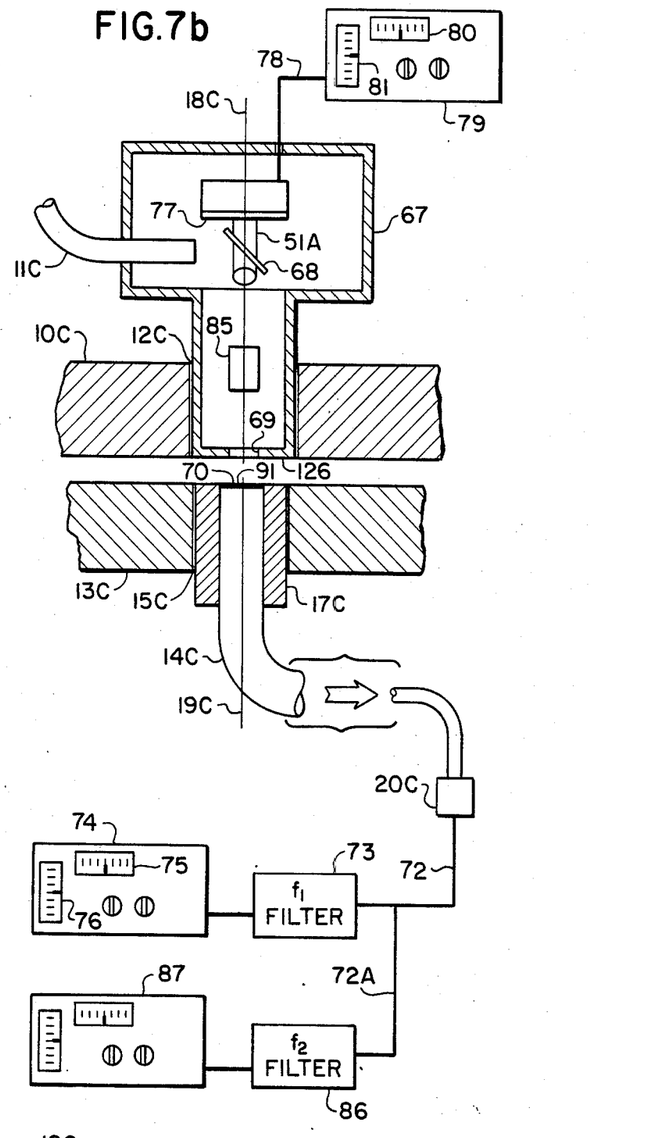
Figure 7C:
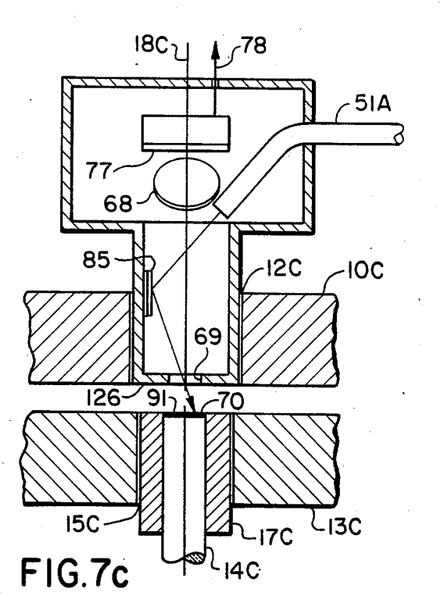
Figure 7D:
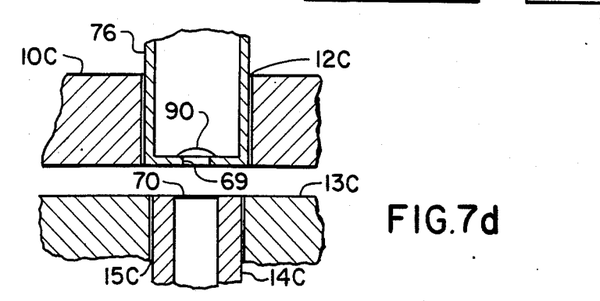

FIG. 7d illustrates an alternative embodiment of the five axis apparatus disclosed in FIGS. 7a through 7c. As shown therein, a lens 90 is disposed in opening 69 so that it acts as an autocollimator wherein any angular mismatch of hole 15C with respect to hole 12C will cause the reflection from surface 70 back through the lens 90 to the photosensitive surface of target 77 to be a constant displacement on that surface regardless of any change in spacing between workpieces 10C and 13C.

Figure 8:
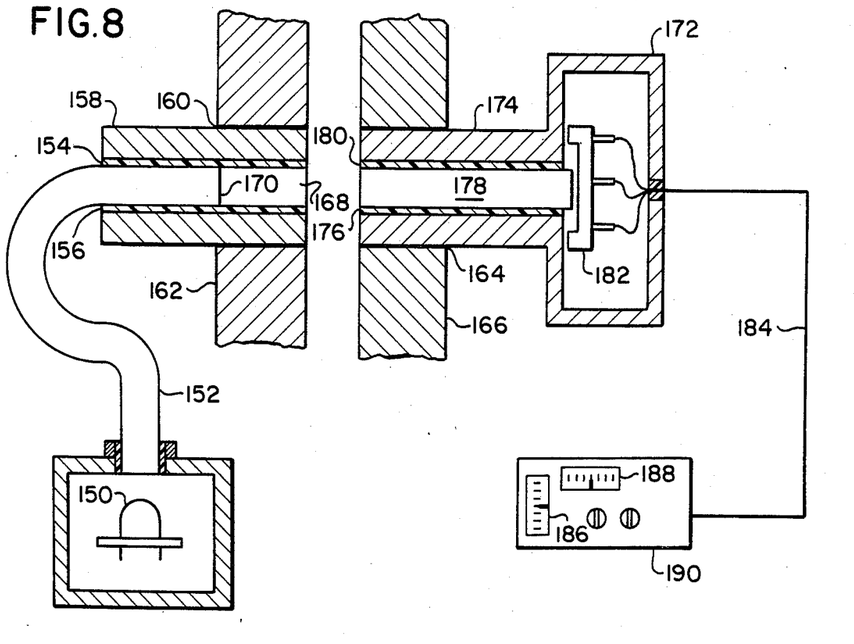
FIG. 8 illustrates a further embodiment of the present invention for two axis measurements of the relative positions of hole patterns.

FIG. 8 illustrates a further embodiment of the hole centration gage of our invention. In this embodiment, a suitable light-emitting diode such as an IR diode 150 is used as the light source. Radiation from the diode is transmitted through a single fiber 152, the end of which is fixed as by means of epoxy resin 154 in the bore 156 of a ferrule 158. The outside diameter of the ferrule is ground such that it is a precision fit in a hole 160 in a first workpiece 162, which hole 160 is to be aligned with a second hole 164 in a second workpiece 166. A suitable cylindrical micro lens 168 can be positioned at the end 170 of optical fiber 152 at the transmitting end of ferrule 158 to help collimate the light projected therefrom. The target unit ferrule 172 has a precision-ground ferrule end 174 which is a precise fit in hole 164 undergoing alignment. Fitted in the bore 176 of the ferrule 172 is a rigid coherent fiber optic conduit 178 which is bonded precisely in position as by means of an epoxy 180 bonding agent. The output radiation from conduit 178 impinges on a 2-axis position-sensitive photodetector 182 which suitably can be a PS-200 photodetector commercially available from the Quantrad Corporation mentioned previously herein. As in the previously described embodiments, the electrical output of photodetector 182 is passed through conduit 184 to drive the displays 186 and 188 of the meters of a recording unit 190. A two-axis analog display commercially available from the Electro Optics Division of Keuffel & Esser, Morristown, N.J., can be used for the recording unit 190. It will be appreciated that the operating characteristics of the FIG. 8 embodiment are essentially the same as the FIG. 1 embodiment and reference should be made to the description thereof for an understanding of the operation of this embodiment.

The above described embodiments of the present invention are illustrative, and modifications thereof may occur to those skilled in the art. The invention is not limited to the embodiments disclosed herein, however, it is limited only as defined by the appended claims.

What is claimed is:

1. An apparatus for determining the position of a first hole with respect to a second hole along the x, y, and z axes thereof, said apparatus having means at said first hole for providing electromagnetic radiation, and having radiation conducting means comprising:
    first means for transmitting the radiation from the radiation providing means along a path that is collinear with a central axis of said first hole,
    second means for transmitting said radiation from said radiation providing means along a path that is oriented at a predetermined angle with respect to said central axis of said first hole,
    means for alternately blocking selectively said radiation transmitted from said first and second transmitting means,
    position sensitive means responsive to said radiation for receiving said radiation transmitted from said radiation transmitting means, said radiation received from said first transmitting means by said receiving means illuminating a first point of a plurality of points to provide a first offset measurement corresponding to the relative position of said first hole with respect to said second hole along the x and the y axes, said radiation received from said second transmitting means by said receiving means illuminating a second point of said plurality of points to provide a secodn offset measurement corresponding to the relative position of said first hole with respect to said second hole along the z axis.

2. An apparatus for determining the relative position of a first hole with respect to a second hole along the x, y, z, yaw, and pitch axes, said apparatus having means at said first hole for providing electromagnetic radiation, wherein:

the means for providing radiation comprises first and second radiation sources;

at least one means responsive to radiation comprising first and second position-sensitive means responsive to radiation for providing three offset measurements;

first means for transmitting radiation from said first radiation source along a path that is collinear with a central axis of said first hole;

second means for transmitting radiation from said second radiation source along a path that is oriented at a predetermined angle with respect to said central axis of said first hole; and means for receiving a portion and reflecting a portion of said radiation transmitted from said first transmitting means, and for receiving said radiation transmitted from said second transmitting means, said portion of said radiation from said first transmitting means received by said receiving means illuminating one of a plurality of points on said first radiation responsive means for providing a first offset measurement corresponding to the relative position of said first hole with respect to said second hole along the x and the y axes, said portion of said radiation from said first transmitting means reflected by said reflecting means illuminating one of a plurality of points on said second radiation responsive means for providing a second offset measurement corresponding to the relative position with respect to pitch and yaw of said first hole with respect to said second hole, said radiation from said second transmitting means received by said receiving means illuminating one of said plurality of points of said first radiation responsive means for providing a third offset measurement corresponding to said relative position of said first hole with respect to said second hole along the z axis.

3. An apparatus as recited in claim 2 wherein the first and second radiation sources are modulated by first and second frequencies and wherein said apparatus further comprises means for filtering said first and second frequencies, said filtering means driving said first radiation responsive means.

4. An apparatus as recited in claim 3 wherein the radiation receiving and reflecting means is coated with a dielectric which passes a first plurality of frequencies and reflects a second plurality of frequencies.

5. An apparatus as recited in claim 4 wherein the first and second radiation transmitting means and the radiation receiving means are each comprised of at least one radiation conducting optical fiber.

6. An apparatus as recited in claim 5 wherein the first and second radiation transmitting means are each comprised of a plurality of optical fibers arranged in a bundle, and the radiation receiving means is comprised of a plurality of optical fibers arranged in a coherent bundle.

7. An apparatus as recited in claims 1 or 2 wherein the first and second radiation transmitting means and the radiation receiving means are each comprised of at least one radiation conducting optical fiber.

8. An apparatus as recited in claim 7 wherein the first and second radiation transmitting means are each comprised of a plurality of optical fibers arranged in a bundle and the radiation receiving means is comprised of a plurality of optical fibers arranged in a coherent bundle.

9. An apparatus as recited in claims 1 or 2 wherein the radiation responsive means is comprised of a radiation-responsive position-sensitive photocell and a recording unit having a plurality of displays and driven by said photocell.

10. An apparatus as recited in claims 1 or 2 wherein the first and second radiation transmitting means is comprised of first and second fiber-optic bundles, respectively, having first and second diameters, respectively, and wherein the radiation receiving means is comprised of a third, coherent fiber-optic bundle having a third diameter greater than either of said first and second diameters.

11. An apparatus for determining the relative position of a first hole with respect to a second hole along the x, y, pitch, and yaw axes thereof comprising:

means at said first hole for providing electromagnetic radiation means for transmitting said radiation from the radiation providing means along a path that is offset from a central axis of said first hole, means for directing said transmitted radiation along a path that is collinear with said central axis, first and second position-sensitive means responsive to radiation for providing two offset measurements, said second position-sensitive means being positioned on said central axis of said first hole, means for receiving a portion and reflecting a portion of said radiation from said transmitting means, said portion of said radiation from said transmitting means received by said receiving means illuminating one of a plurality of points on said first radiation responsive means for providing a first offset measurement corresponding to the relative position of said first hole with respect to said second hole along the x and y axes, said portion of said radiation from said transmitting means reflected by said reflecting means illuminating one of a plurality of points on said second radiation responsive means for providing a second offset measurement corresponding to the relative position with respect to pitch and yaw of said first hole with respect to said second hole.

12. An apparatus as recited in claims 11 or 2 wherein said first and second radiation responsive means is each comprised of a radiation-responsive position-sensitive photocell and a recording unit having a plurality of displays and driven by said photocell.

13. An apparatus as recited in claims 1, 11 or 2 wherein the radiation providing means has a gaussian distribution.

14. An apparatus as recited in claim 13 wherein the radiation providing means is a laser.

15. An apparatus as recited in claims 1, 11 or 2 wherein the radiation providing means has a flat field.

16. An apparatus as defined in claim 15 wherein said radiation providing means is an I.R. Diode.

17. An apparatus for determining the relative positioning of a first hole with respect to a second hole comprising:
- at least one source of electromagnetic radiation;
- means for transmitting light from said at least one radiation source along a path collinear with a central axis of said first hole;
- means for transmitting radiation from said at least one radiation source along a path oriented at a predetermined angle with respect to said central axis of said first hole;
- means for receiving radiation transmitted from said collinear and said angular radiation transmitting means;
- means for causing the radiation receiving means to alternately receive said radiation transmitted by said collinear light trnasmitting means and said angular radiation transmitting means; and
- position-sensitive means responsive to radiation received by said light receiving means for providing an offset measurement representative of the relative positioning of said first hole with respect to said second hole along first and second axes said radiation responsive means responding to angular radiation to provide a second offset measurement representative of the relative positioning of said first hole with respect to said second hole along a third axis.

18. An apparatus as recited in claim 17 wherein the at least one radiation source comprises first and second radiation sources, and the radiation receiving means further comprise means for reflecting a portion of said radiation from said first radiation source, and wherein said apparatus further comprises position-sensitive means responsive to radiation reflected by said reflecting means for providing a third offset measurement representative of the pitch and yaw of said second hole relative to said first hole.

19. An apparatus as recited in claim 18 wherein the first and second radiation sources have a gaussian distribution.

20. An apparatus as recited in claim 19 wherein the first and second radiation sources are lasers.

21. An apparatus as recited in claim 19 wherein the first and second radiation sources are modulated by first and second frequencies, respectively.

22. An apparatus as recited in claim 21 further comprising means for filtering the first and second frequencies, said filtering means driving said first radiation responsive means.

23. An apparatus as recited in claim 18 wherein the means responsive to radiation received by the receiving means and the means responsive to radiation reflected by the reflecting means are comprised of a radiation-responsive positon-sensitive photocell and a balanced recording unit having a plurality of displays and being driven by said photocell.

24. An apparatus for determining the relative position of a first hole with respect to a second hole along the x, y, and z axes comprising:
- a source of electromagnetic radiation;
- a first fiber-optic bundle transmitting radiation from said radiation source along a path that is collinear with a central axis of said first hole;
- a second fiber-optic bundle transmitting radiation from said radiation source along a path that is oriented at a predetermined angle with respect to said central axis of said first hole; said first and second fiber-optic bundles being mounted within a first ferrule disposed within said first hole;
- a third fiber-optic bundle receiving said radiation transmitted from said first and second fiber-optic bundles;
- a shutter mechanism for causing said third fiber-optic bundle to alternately receive said radiation transmitted from said first and second fiber-optic bundles;
- a radiation-responsive, position-sensing photocell responsive to radiation received by said third fiber-optic bundle;
- a multi-display recording unit driven by said photocell,
- said radiation received from said first fiber-optic bundle by said third fiber-optic bundle causing said photocell and said recording unit to provide a first offset measurement corresponding to the relative position of the first hole with respect to the second hole along the x and the y axes,
- said radiation received from said second fiber-optic bundle by said third fiber-optic bundle causing said photocell and said recording unit to provide a second offset measurement corresponding to the relative position of said first hole with respect to said second hole along the z axis.

25. An apparatus for determining the relative position of a first hole with respect to a second hole along the x, y, pitch, and yaw axes comprising:
- a source of electromagnetic radiation;
- a first fiber-optic bundle transmitting radiation from said radiation source along a path that is offset from the central axis of said first hole, said first fiber-optic bundle being mounted in a first ferrule disposed within said first hole;
- means in said first ferrule for directing said radiation along a path that is collinear with said central axis;
- a second fiber-optic bundle for receiving radiation from said first fiber-optic bundle, said second fiber-optic bundle being mounted within a second ferrule disposed within said second hole and having a coating thereon for reflecting a portion of said radiation transmitted by said first fiber-optic bundle;
- a first radiation-responsive, position-sensing photocell responsive to radiation received by said second fiber-optic bundle;
- a first multi-display recording unit driven by said first photocell, said radiation transmitted by said first fiber-optic bundle causing said first photocell and said first recording unit to provide a first offset measurement corresponding to the relative position of said first and second holes along the x and y axes.
- a second radiation-responsive, position-sensing photocell on said central axis of said first hole responsive to radiation reflected by said coating on said second fiber-optic bundle; and
- a second multi-display recording unit driven by said second photocell said radiation from said first fiber-optic bundle reflected by said coating on said second fiber-optic bundle causing said second photocell and said second recording unit to provide a second offset measurement corresponding to the pitch and yaw of said second hole relative to the first.

26. An apparatus for determining the relative position of a first hole with respect to a second hole along five axes (x, y, z, pitch and yaw) comprising:

first and second sources of electromagnetic radiation modulated to produce first and second frequencies, respectively;

a first fiber-optic bundle transmitting radiation from said first radiation source along a path that is collinear with a central axis of said first hole;

a second fiber-optic bundle transmitting radiation from said second radiation source along a path that is oriented at a predetermined angle with respect to said central axis of said first hole, said first and second fiber-optic bundles being mounted in a ferrule disposed within said first hole;

a third fiber-optic bundle for receiving radiation from said first and second fiber-optic bundles, said third fiber-optic bundle being mounted within a second ferrule disposed within said second hole and having a coating thereon for reflecting a portion of said radiation transmitted by said first fiber optic bundle from said first radiation source;

a first radiation-responsive, position-sensing photocell responsive to radiation received by said third fiber-optic bundle;

a first multi-display recording unit and first frequency filter driven by said first photocell, said radiation transmitted by said first fiber-optic bundle and received by said third fiber-optic bundle causing said first photocell and said first recording unit to provide a first offset measurement corresponding to the relative position of the first and second holes along the x and y axes;

a second multi-display recording unit and second frequency filter driven by said first photocell, said radiation transmitted by said second fiber-optic bundle and received by said third fiber-optic bundle causing said first photocell and said second recording unit to provide a second offset measurement corresponding to the relative position of said first and second holes along the z axis;

a second radiation-responsive, position-sensing photocell responsive to radiation reflected by said coating on said third fiber-optic bundle; and a third multi-display recording unit driven by said second photocell, said radiation from said first fiber-optic bundle reflected by said coating on said third fiber-optic bundle causing said second photocell and said third recording unit to provide a third offset measurement corresponding to the pitch and yaw of said second hole relative to said first hole.

* * * * *